D. B. GERRY.
ICE-PLOW.

No. 176,619. Patented April 25, 1876.

WITNESSES:
E. A. West
O. W. Bond

INVENTOR:
David B. Gerry

N. PETERS, PHOTO-LITHOGRAPHER, WASHINGTON, D. C.

UNITED STATES PATENT OFFICE.

DAVID B. GERRY, OF CHICAGO, ILLINOIS, ASSIGNOR TO ANSON S. PIPER, OF SAME PLACE.

IMPROVEMENT IN ICE-PLOWS.

Specification forming part of Letters Patent No. 176,619, dated April 25, 1876; application filed November 16, 1875.

*To all whom it may concern:*

Be it known that I, DAVID B. GERRY, of Chicago, Cook county, State of Illinois, have invented new and useful Improvements in Ice-Plows, of which the following is a full description, reference being had to the accompanying drawings, in which—

Figure 1:
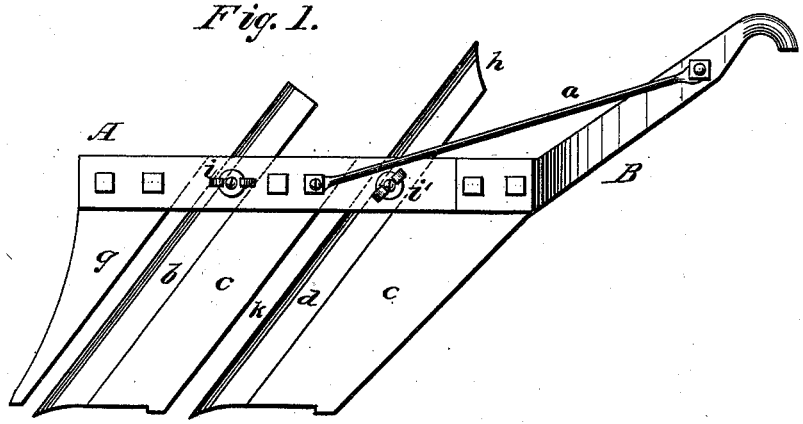
Figure 2:
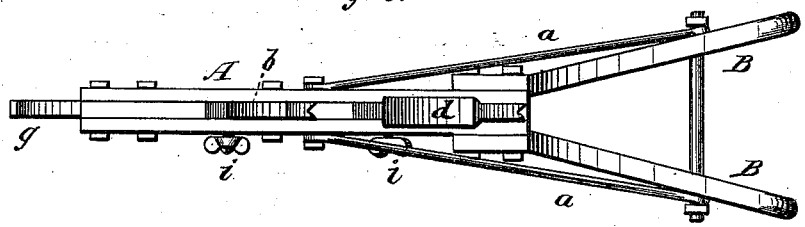
Figure 3:
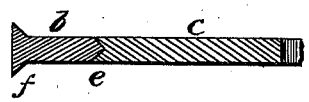

Figure 1 is an elevation; Fig. 2, a top view; Fig. 3, an enlarged detail, showing one tooth in section.

As the teeth of ice-plows have been heretofore made, it is necessary, when a tooth is broken in use, to cut or grind off all the teeth to bring them again to a common line. The object of this invention is chiefly to obviate this difficulty, which I accomplish by making the teeth in two parts, one of which can be easily removed, and also adjusted as desired.

In the drawings, A represents the frame or back in which the teeth are secured. It can conveniently be made of two pieces between which the teeth can be placed, being secured as described, or in other suitable manner. B are the handles. *a* are braces. The teeth are made in two parts—one part is for cutting, and is made adjustable; the other part supports the cutter, and serves as a guide to limit the depth of the cutting. *b* represents the cutting portion, and *c* the supporting portion, of the tooth. The rear edge of *b* is provided with a tongue, and the front edge of *c* has a corresponding groove, as shown at *e*, Fig. 3, by means of which any lateral movement of *b* is prevented.

I do not limit myself to this exact device for preventing such lateral movement. The object may be accomplished by properly securing the cutter at its upper end, or in any other known suitable manner.

This cutter *b*, as shown, is held in place by means of a set-screw, *i*; but a bolt and nut might be used. It can be moved up and down in A, so that, as its point wears away, it can be adjusted; or if the point becomes broken it can be repointed, or a new cutter can be inserted, *c* remaining unchanged. This part *c* can be secured in A by means of bolts. The front edge of the cutter has a flange, *f*, upon each side, to facilitate the operation of the device. In *b* these flanges do not extend to its upper end. *d* represents another cutter, the same in construction as *b*, except that the flanges *f* extend to the upper end thereof, and there it is provided with a cutting-point, *h*, the same as at the lower end, so that if the lower end becomes dull, or is broken, the cutter can be reversed. *d* is secured in A by means of a set-screw, *i'*, or otherwise.

The cutters may be straight from top to bottom, as shown, or they may be curved. Between the several cutters there is a space, *k*, which may be wider at the top than at bottom, if desired. *g* is located in front of the forward cutter, to clear the path.

I have shown only two cutters in the drawings; but the frame or bars A may be lengthened, and such number of cutters may be used as may be convenient. The space in the bars between the several cutters can be filled with suitable blocks.

I have not given the sizes of the several parts, as any one at all familiar with ice-plows will be able to determine the sizes and proportions.

What I claim as new, and desire to secure by Letters Patent, is as follows:

In an ice-plow, an adjustable cutter, in combination with the fixed part *c* and frame or back A, all constructed and operating substantially as and for the purposes set forth.

DAVID B. GERRY.

Witnesses:
   E. A. WEST,
   O. W. BOND.